Figures 1, 2:
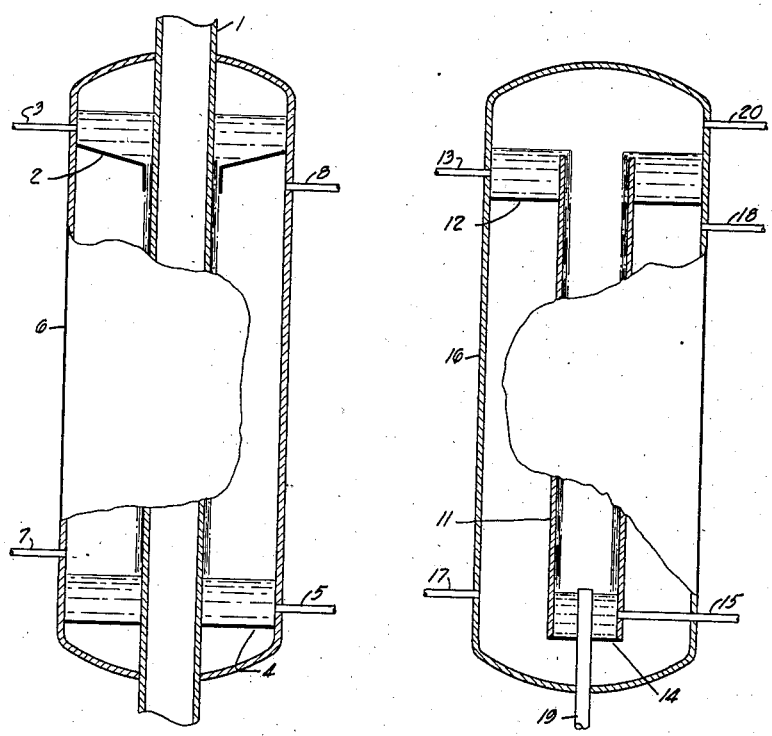

Oct. 18, 1938.  H. I. WATERMAN ET AL  2,133,735
METHOD OF REACTING FLUID REAGENTS
Filed March 27, 1936

Inventors:
Hein I. Waterman
Jacob J. Leendertse
Willem J.C. de Kok

By their Attorney: Arthur B. Babaian

Patented Oct. 18, 1938

2,133,735

UNITED STATES PATENT OFFICE 2,133,735

METHOD OF REACTING FLUID REAGENTS

Hein Israel Waterman, Jacob Jan Leendertse, and Willem J. C. de Kok, Delft, Netherlands, assignors to Shell Development Company, San Francisco, Calif., a corporation of Delaware Application March 27, 1936, Serial No. 71,338
In the Netherlands April 25, 1935

11 Claims. (Cl. 260—614)

This invention deals with a novel procedure for conducting chemical reactions between fluid reactants, particularly reactions between liquids and gases reactive therewith or between two liquid reactants each of which has a low physical solubility in the other. It provides a method whereby such reactions may be more accurately controlled, both as to temperature and rate, so as to not only give increased yields but also products of greater purity as a result of elimination of undesirable side reactions.

The invention may be applied to the reaction of any suitable reactants which form reaction mixtures made up of two fluid phases regardless of the nature of the chemical reaction or reactions involved. As examples of the diverse reactions to which our invention may be applied, the halogenation of hydrocarbons, both saturated and unsaturated, using either free halogen or hydrogen halide, the sulfonation of aromatic compounds, the hydrogenation of unsaturated compounds and the absorption of olefines in acids may be mentioned as typical of reactions involving a liquid and a gas, while applications involving two liquid phases include, the nitration of aromatic hydrocarbons, amination of substituted aromatics by ammonolysis, hydrolysis of esters, and the like. In many cases, for example, the absorption of olefines, sulfonation of aromatics and the hydrolysis of esters either a liquid-gas or a liquid-liquid system may be used depending upon the particular reagents involved and the conditions under which the reaction is carried out.

We have found that by carrying out reactions of the above described types in an unobstructed column in which one of the reactants is present as a thin liquid film, control of the reaction conditions, particularly the reaction temperature, is greatly facilitated and uniform reaction conditions are easily maintained. Our process is thus radically different from prior procedures for reacting together fluid reagents which form polyphase systems, since such prior methods have been largely restricted to batch methods of operation with their obvious attendant disadvantages, among which are the necessity for complicated stirring equipment to promote contact between the phases present, high labor costs, etc. Proposals have been made for carrying out such reactions continuously whereby some of the deficiencies of the batch methods may be overcome. These have usually taken the form of bubbling, or otherwise forcing, one reagent thru a large body of a liquid reactive therewith. Such methods suffer from the disadvantage of not providing any adequate means for maintaining accurate and uniform reaction conditions. Our process, on the other hand, not only provides for accurate temperature regulation uniformly thruout the reaction zone whether the reaction involved is exothermic or endothermic but also permits of economical continuous reaction in very simple rugged, inexpensive apparatus.

While our invention is thus broadly applicable wherever fluid reagents which form two or more phases are reacted, for the purpose of making the invention more clear it will be described with more particular reference to the manufacture of halogenated ethers, an application in which it has special advantages. But it will be understood that this is merely in the interest of conciseness and clarity and implies no limitation since by obvious modifications our invention may be applied with equal success not only to the other types of reaction listed above, but also to many other reactions between still different fluid reactants.

It is known that halogenated ethers may be obtained by treating a mixture of an aldehyde or a ketone and an alcohol with a hydrogen halide. The reaction may be represented by the following general equation:

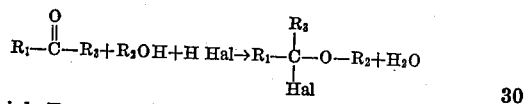

in which $R_1$ and $R_3$ may either or both represent hydrogen or the same or different organic groups such as alkyl, alkoxy, carboxylic, heterocyclic, aralkyl, aryloxy, or aralkoxy groups which may or may not be further substituted and may or may not contain unsaturated bonds. $R_2$ denotes an organic group which may be the same as or different than the organic groups represented by $R_1$ and $R_3$. By use of an excess of "keto" compound, i. e., of aldehyde or ketone or both, the formation of dihalogen ethers of the type

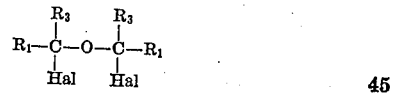

may be promoted.

The method hitherto followed in carrying out these reactions has consisted in introducing hydrogen halide gas into the bottom of a liquid mixture of an aldehyde and an alcohol. In such procedures it is practically impossible to avoid mixing the two liquid layers formed during the reaction, an ether-containing upper layer and an aqueous lower layer. This mixing is intensified by high feed velocities of hydrogen halide gas which are desirable in promoting practical reaction rates. As a result of the mixing of the layers, the halogenated ether produced is rapidly decomposed under the influence of water and not only is the yield thus greatly reduced but also the formation of undesirable resinification products is encouraged. We have found that these disadvantages may be substantially eliminated by causing the acid in gaseous phase to react on a thin layer of the liquid mixture of the keto compound and the alcohol. While the reaction may in general be carried out in any apparatus suitable for bringing a liquid film into contact with a gas, we prefer, because of its simplicity and ease of operation and control, to use a vertical tube or tubes along one surface of which the liquid mixture is conducted as a film, preferably at a rate at which the surface is uniformly wetted and passing a gaseous stream of hydrogen halide in contact therewith, preferably in a direction countercurrent to the flow of liquid.

Figure 3:
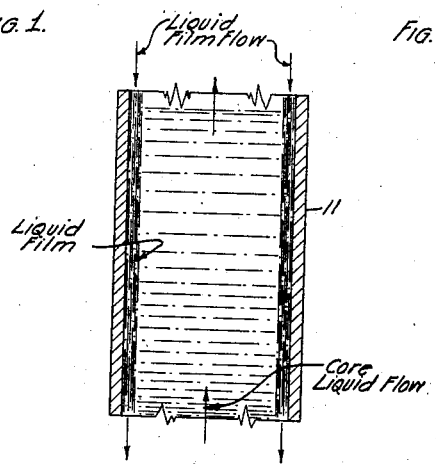

In the drawing, Figures 1 and 2 show in diagrammatic section, two modifications of a preferred type of apparatus for reacting gases with liquid films. While Figure 3 shows a section of the apparatus of Figure 2 when the gaseous reagent is replaced by a liquid.

The apparatus shown in Figure 1 consists of a vertical tower 1 which may conveniently be a cylindrical pipe, on which the liquid reactant, in the present case the mixture of keto compound and alcohol, flows. The liquid is fed from a distributing vessel 2 shown in its simplest form as a conical vessel with an inlet pipe 3, suitably supported in position around the vertical pipe 1. The diameter of the narrow end of the conical distributor is preferably about 0.5 cm. larger than the outside diameter of the vertical pipe. The liquid reactant flows thru this annulus between the pipe and the distributor and runs down the pipe in the form of a continuously moving thin film. A collecting vessel 4 closely attached to the pipe near its bottom may be used for collecting the reaction products which may be withdrawn thru an outlet such as 5. Surrounding the pipe 1 is a chamber 6 having inlet and outlet openings 7 and 8 thru which hydrogen halide or other gaseous reactants may be circulated. Thru the center of pipe 1 a temperature controlling medium may be circulated to maintain the desired reaction temperature. Where the reaction is exothermic, cooling water, or a refrigerant such, for example, as cooled brine or liquid ammonia or pentane, or other agents including cooling oils and the like, may be used. For endothermic reactions the temperature controlling medium may consist of a hot fluid such as steam, or hot water or a high-boiling organic compound, as a petroleum fraction such as a lubricating oil fraction, or the like, or diphenyl, polyalkylated naphthalenes, etc., or inorganic materials such as mercury, lead and like low-melting metals or alloys or fused salts as, for example, an eutectic mixture of sodium nitrate and sodium nitrite, or the like. The particular temperature control medium which will be used in any particular case will depend upon the reaction involved and the above examples serve only to show the diversity of media which are suitable under different conditions and are not intended to be exhaustive. Whatever the temperature control medium chosen, it will be apparent that the apparatus shown provides unusual facilities for the maintenance of uniform conditions thruout the reaction zone which is everywhere in direct heat transfer relationship with the tube 1. It will be understood that conventional methods of reaction temperature control including preheating or precooling of reactants and/or the use of diluents or other temperature regulating agents with either or both of the reactants may be used in lieu of or as supplements to the temperature regulating system here described without departing from the spirit of our invention.

Figure 2 shows an arrangement for utilizing the inside wall of a pipe or other form of vertical tower 11 as the wetted area. The distributor 12 in this case may take the form of a simple overflow arrangement, the liquid reactant, for example, the mixture of keto compound and alcohol used in the manufacture of halogenated ethers, being fed at 13 at such a rate that a uniform film is obtained. As before the reacted liquid is collected at the bottom 14 and withdrawn thru an outlet 15. In this case an exterior jacket 16 having inlet and outlet openings 17 and 18 may be used for circulation of the temperature control medium while the gaseous reactant, e. g., hydrogen halide, is admitted thru a pipe 19 at the bottom and the excess, if any, taken off at 20.

The same types of apparatus may be used for carrying out reactions between two liquids, each of which has a low physical solubility in the other. Thus in the arrangement shown in Figure 1, the gas fed at 7 may be replaced by a liquid and similarly in the apparatus of Figure 2 a liquid may be admitted thru pipe 19. Figure 3 shows the central core of liquid reactant flowing upwards completely surrounded by a thin film of the second reactant separating the central core from the pipe wall and flowing countercurrently to the first liquid reactant which is obtained in the latter case. In order to start such a system in operation, employing, say tertiary olefine containing hydrocarbon and 65% H$_2$SO$_4$ as the reactants, it is desirable to start the sulfuric acid as the wall film, using a low rate of flow. When it is certain that the whole inside surface of the pipe is evenly wetted by the acid, the hydrocarbon is slowly introduced into the core until all the remaining space occupied by air becomes filled with hydrocarbon; the flow of both liquids can then be adjusted to the required rates. Once started the system runs smoothly and easily, and both liquid rates can be varied over a wide range without the system breaking down. A higher limit exists for the core liquid rate, however, above which the core is broken into small globules. Similarly, a higher limiting rate exists for the wall liquid above which the column becomes filled with wall liquid thru which globules of core liquid rise. A lower limiting rate also exists for the wall liquid below which channelling of this liquid occurs and instead of covering the whole wall area the liquid flows down the wall in a thick stream covering only a small part of the surface. Such channelling may also occur at low rates of wall liquid flow when gaseous reactants are used. Obviously either extreme is preferably to be avoided.

As applied to the manufacture of halogenated ethers it is desirable to pass the reacted mixture thru a drying agent, e. g., Na$_2$SO$_4$, or the like, whereby the dissolved hydrogen halide gas is released and may be returned to the reactor. The remaining mixture of unreacted keto compound and alcohol together with the halogenated ether produced may then be passed in film form thru the same reactor or thru a similar reactor in series therewith, for further conversion of the unreacted components or the latter may be separated from the reaction mixture before their return. Where a plurality of film reactors are used they may be connected in parallel or series or parallel-series arrangements.

The reaction of the hydrogen halide gas upon the mixture of keto compound and alcohol may be carried out under atmospheric, subatmospheric or superatmospheric pressures. The latter is particularly advantageous where keto compounds and alcohols having low rates of reaction are used. The optimum temperature of reaction will similarly vary with the reactants and products involved. In general low temperatures, for example 0° C. or lower are desirable in order to avoid secondary reactions particularly decomposition of the halogenated ether produced. In some cases higher temperatures are permissible, however, for instance where more stable ethers are being manufactured. The reaction is exothermic so it is necessary to provide adequate means for removing the heat produced in order to keep the reaction temperature within the desired limits.

The following examples illustrate how the invention may be applied to the manufacture of typical halogenated ethers.

*Example I*

A mixture of 86 gr. 96% ethanol and 127 gr. paraldehyde was allowed to run down, in about 10 to 15 minutes, in the form of a film, the inside wall of a vertical tube cooled with ice and salt and having an inner surface of about 350 cm$^2$, while an excess of HCl gas was passed through the tube in countercurrent to the liquid film. The reaction product was in two layers, an upper layer containing the desired chloro-ether and an aqueous lower layer, which were separated, after which the upper layer was passed through the tube two times more in the manner described above, in order to make the reaction as complete as possible.

The upper layer finally obtained weighed 265 gr. corresponding to a yield of 97% crude product calculated on the theoretically possible quantity of monochlor- and dichlor ether (in all 273 gr. viz. 195 gr. monochlor ether and 78 gr. dichlor ether, which can be formed from the excess of paraldehyde). In this rough calculation no account has been taken of the hydrochloric acid dissolved in the upper layer. By vacuum distillation of the upper layer dried on CaCl$_2$ there were obtained 19% of a first running boiling below 27° at 140 mm. pressure and consisting of monochlor ether, HCl and non-converted aldehyde, 51% of a fraction boiling at 37° under 75–72 mm. pressure, and 17% of a fraction boiling at 35–37° under 50 mm. pressure; these two last fractions consisted of chlor-1 ethoxy-1 ethane contaminated with 1.1'-dichlor-di-ethyl ether. Calculating these fractions as chlor-1-ethoxy-1 ethane, the yield is 92% of the theoretically possible 195 gr. of this compound. The residue of the vacuum distillation was 13% and consisted for a large part of the di-chlor ether.

When applying the usual method whereby the hydrochloric acid gas is fed into the mixture of aldehyde and alcohol, from a mixture of 210 gr. ethanol and 200 gr. paraldehyde cooled with ice and salt the yield after a reaction period of 5 hours was 270 gr. upper layer, corresponding to a conversion into crude chlor-1 ethoxy-1 ethane of only 55%.

*Example II*

A mixture of 54 gr. paraldehyde and 83 gr. hexanol-2 was allowed to run down, in 5 minutes, in the form of a film, the inside wall of a vertical tube cooled with ice water and having an inner surface of about 350 cm$^2$, while hydrochloric acid gas was led in in countercurrent. In order to make the reaction as complete as possible the reaction product was passed through the tube two times more in the manner described; however, there was then hardly any more formation of an aqueous layer.

The reaction product consisted of an aqueous layer (22 cm$^3$) and 150 gr. of an upper layer containing the chloro ethers. The theoretically possible quantity of chloro ethers was 163 gr. The upper layer was dried on P$_2$O$_5$ and distilled under reduced pressure. The following fractions were thereby obtained: 12% boiling from 42 to 50° at 14 mm. pressure, 13.6% boiling from 50 to 60° at 14 mm., 33.6% boiling from 62 to 65° at 15 mm. and 18.4% boiling at 65° under 13 mm. pressure.

The three last fractions were found to contain, in addition to non-converted hexanol-2, respectively 95.5%, 92% and 85% of the desired ether (chlor-1' ethoxy)-1 methyl-1 pentane. The average content of the said ether in these three fractions together was about 90%, so that the yield of that ether is about 60%.

Although the process of the invention is particularly important in the conversion of ethanal or paraldehyde to halogenated ethers it may also be used with a wide variety of other keto compounds. Typical aldehydes which may be used in place of or together with paraldehyde include, for example, aliphatic aldehydes such as methanal, propanal, methyl-2-propanal, pentanal, 2-methyl butanal (4), trimethyl acetaldehyde, and higher homologues, analogues and substitution products such, for example, as chloral and the like, or carbocyclic aldehydes, such as cyclopentane-aldehyde, benzaldehyde, the toluic aldehydes, etc., or heterocyclic aldehydes such as furfural, the quinoline-aldehydes and the like. Ketones which may be similarly used are, for example, acetone, methyl-ethyl ketone, methylpropyl, methyl-isopropyl, diethyl, methyl-normal-butyl, methyl-isobutyl, methyl-secondary butyl, methyl-tertiary butyl, di-acetyl and like aliphatic ketones and substitution products thereof, or carbocyclic ketones such as aceto-phenone, p-acetyl-toluol, benzyl-propyl ketone, benzoyl-acetone and the like, or the corresponding heterocyclic compounds. Further, the reaction can be successfully applied in the manner indicated with other alcohols, for instance, methanol, propanol-1, propanol-2, the butanols or pentanols or allyl alcohol, cyclohexanol, benzyl alcohol and like monohydric alcohols or their substitution products or polyhydric alcohols including the glycols such as ethylene glycol, isobutylene glycol, etc., or glycerine, or pyrocatechol, and the like.

The process of the invention offers appreciable advantages over prior methods of bringing about the above mentioned reactions. In the first place, in consequence of the reacting surface being considerably enlarged and the better separation of the ether and water layers, much higher yields of the desired halogenated ethers may be obtained at a higher rate so that per unit of time larger quantities of the reaction components may be converted. Furthermore the heat liberated in the reaction may be carried off more quickly and uniformly, thus checking evaporation losses and reducing side reactions.

Similar advantages are obtainable in the wide variety of other reactions to which the invention is applicable. Thus, for example, in the reaction of tertiary olefine containing hydrocarbons with sulfuric and like acids, the reaction may be carried out in the presence of secondary olefines with greatly improved selectivity and materially reduced polymerization losses due to the efficiency with which the heat of reaction may be removed, compared with prior methods operating on the hydrocarbon and/or acid in bulk. Furthermore, the absorption of isobutylene, for example, which results in the substantially instantaneous formation of tertiary butyl alcohol, is much more rapid in our method of film reaction than in known packed tower procedures because the tertiary butyl alcohol accumulates in the film and since isobutylene is much more soluble in tertiary butyl alcohol than in acid, the absorption coefficients of the substantially undisturbed films present in our procedure are much greater than those of equivalent uniform mixtures of the same components. Similar advantages apply to the sulfation of secondary olefines and/or ethylene, the latter, for example, being very much more soluble in ethyl hydrogen sulfate than in sulfuric acid.

The process is equally advantageous in the production of aromatic sulfonic acids, as by reaction of benzene with sulfuric acid; or in the prohalogenation of toluene, for example; or the production of p-nitro-aniline from p-nitro-chlorobenzene and aqueous ammonia and a large number of other diverse reactions.

Catalysts, dissolved or suspended in the film liquid, or, in the case of reactions between two liquids, in either or both of the reactants, may be used where suitable to accelerate or modify the reaction. Alternatively, or in conjunction therewith, the surface over which the film is conducted may be of a material which has a catalytic influence on the reaction in which case it may be advantageous to activate that surface to promote its catalytic effect. The process can also be effected in the presence of solid substances which participate in the reaction and are carried along with the liquid film.

While the invention has been described with special reference to certain preferred forms of equipment particularly adapted for carrying the process out in a continuous manner, it will be understood that the invention is not to be regarded as limited to the details of operation described as satisfactory results may also be obtained using modified apparatus such, for example, as horizontal or inclined trays or other substantially unobstructed surfaces, or, particularly for batch reactions between liquids and gases, rotating cylinders which dip into one reactant and carry it in the form of a film into contact with the other reactant, or other suitable arrangements embodying the essential feature of contacting a substantially unbroken liquid film of one reactant with the fluid with which it is to be reacted.

We claim as our invention:

1. A process of producing a halogenated ether which comprises reacting on a thin substantially unbroken film of a liquid mixture comprising a keto compound containing an aliphatic group linked to a carbonyl carbon atom to which only one oxygen atom is attached, the carbonyl group forming an acyl radical with the remainder of the compound and an alcohol with a hydrogen halide in the gaseous phase.

2. A process of producing a halogenated ether which comprises reacting on a thin substantially unbroken film of a liquid mixture comprising a ketone having an aliphatic group linked to the carbonyl group, the carbonyl group forming an acyl radical with the remainder of the compound, and an alcohol with a hydrogen halide in the gaseous phase.

3. A process of producing a halogenated ether which comprises reacting on a thin substantially unbroken film of a liquid mixture comprising an aldehyde and an alcohol with a hydrogen halide in the gaseous phase.

4. A process of producing a halogenated aliphatic ether which comprises reacting on a thin substantially unbroken liquid layer of a mixture of an aliphatic keto compound containing an aliphatic group linked to a carbonyl carbon atom to which only one oxygen atom is attached, the carbonyl group forming an acyl radical with the remainder of the compound and an aliphatic alcohol with a hydrogen halide in the gaseous phase.

5. A process of producing a halogenated ether which comprises reacting with a hydrogen halide in the gaseous phase upon a thin substantially unbroken liquid layer of a mixture of paraldehyde and an aliphatic alcohol at a temperature below 0° C.

6. A process of producing a halogenated ether which comprises reacting with a hydrogen halide in the gaseous phase upon a thin substantially unbroken liquid layer of a mixture of a keto compound containing an aliphatic group linked to a carbonyl carbon atom to which only one oxygen atom is attached, the carbonyl group forming an acyl radical with the remainder of the compound and an alcohol, treating the reacted liquid with a drying agent and further reacting the unconverted components of said liquid with hydrogen halide gas.

7. A process of conducting an organic chemical reaction between reactive fluids which form a reaction mixture made up of a liquid phase containing at least one reactant, a second fluid phase containing another reactant and a third phase comprising a reaction product of said reactants in the liquid state which product is reactive under the reaction conditions with a component of the first said liquid phase comprising reacting on a thin substantially unbroken film of the first said liquid phase with said second fluid phase, while regulating the rate of film flow during the reaction so that turbulence is avoided and stratification of the liquid products of the reaction takes place under the conditions prevailing, and separating the reaction product therefrom.

8. A process of conducting an organic chemical reaction between reactive fluids which form a reaction mixture made up of a liquid phase containing at least one reactant and a reaction product thereof, a second fluid phase containing another reactant and a third fluid phase comprising another reaction product of said reactants which is reactive under the reaction conditions with the first said reaction product comprising reacting on a thin substantially unbroken film of the first said liquid phase with said second fluid phase, while regulating the rate of film flow during reaction so that turbulence is avoided and stratification of the liquid products of the reaction takes place under the conditions prevailing, and separating the reaction product therefrom.

9. A process of conducting an organic chemical reaction between reactive fluids which form a reaction mixture made up of a liquid phase containing at least one reactant, a gas reactive therewith and a liquid reaction product of said reactants which is incompletely miscible with the first said liquid phase and reactive with a component thereof under the reaction conditions, comprising reacting on a thin substantially unbroken film of the first said liquid phase with said gas while regulating the rate of film flow during reaction so that turbulence is avoided and stratification of the liquid products of the reaction takes place under the conditions prevailing, and withdrawing reaction product containing phase.

10. A process of producing a halogenated ether which comprises reacting with a hydrogen halide in the gaseous phase upon a thin flowing liquid film of a mixture of a keto compound containing an aliphatic group linked to a carbonyl carbon atom to which only one oxygen atom is attached, the carbonyl group forming an acyl radical with the remainder of the compound and an alcohol in heat exchange relation with a temperature regulating medium, stratifying the resulting liquid reaction products and decanting off the layer containing said halogenated ether.

11. A process of producing a chlorinated ether which comprises reacting with gaseous hydrogen chloride upon a thin substantially unbroken liquid layer of a mixture of an aliphatic keto compound containing an aliphatic group linked to a carbonyl carbon atom to which only one oxygen atom is attached, the carbonyl group forming an acyl radical with the remainder of the compound and an alcohol.

HEIN ISRAEL WATERMAN.
JACOB JAN LEENDERTSE.
WILLEM J. C. DE KOK.